US005301934A

United States Patent [19]

Lynn et al.

[11] Patent Number: 5,301,934

[45] Date of Patent: Apr. 12, 1994

[54] TWIN SCREW VISE

[75] Inventors: John S. Lynn, Ottawa; Francis A. McLean, Oxford Station; Edwin C. Tucker, Ottawa; Lloyd Sevack, Nepean; Gary W. Lacoste, Almonte; Timothy C. Frank, Ottawa; Michel Perrier, Orleans; Leonard G. Lee, Ottawa, all of Canada

[73] Assignee: Lee Valley Tools Ltd., Ottawa, Canada

[21] Appl. No.: 927,326

[22] Filed: Aug. 10, 1992

[51] Int. Cl.[5] ..... B23Q 1/04

[52] U.S. Cl. ..... 269/222

[58] Field of Search ..... 192/67 P; 74/89.15, 74/89.21; 269/139, 218–220, 221–223, 225, 246, 172, 188, 189

[56] References Cited

U.S. PATENT DOCUMENTS

| | | | |
|---|---|---|---|
| 3,212 | 8/1843 | Matthews . | |
| 293,058 | 2/1884 | Moore . | |
| 326,138 | 9/1885 | Moore | 269/172 |
| 467,781 | 1/1892 | Palm et al. . | |
| 515,986 | 3/1894 | Barnard . | |
| 663,145 | 12/1900 | Zwart . | |
| 816,508 | 3/1906 | Snow . | |
| 985,857 | 3/1911 | Thomas . | |
| 1,392,434 | 10/1921 | Miller . | |
| 3,208,744 | 9/1965 | Slifer | 269/225 |
| 4,858,902 | 8/1989 | Hickman . | |
| 4,953,839 | 9/1990 | Chern | 269/222 |
| 5,048,653 | 9/1991 | Fellows | 192/67 P |

FOREIGN PATENT DOCUMENTS

| | | |
|---|---|---|
| 505411 | 9/1951 | Belgium . |
| 524066 | 4/1955 | Italy . |

OTHER PUBLICATIONS

Landis, Scott, *The Workbench Book*, p. 133 (1987) The Taunton Press Inc.

*Primary Examiner*—Robert C. Watson
*Attorney, Agent, or Firm*—Kilpatrick & Cody

[57] ABSTRACT

A twin screw vise utilizing two threaded vise screw rods that are journaled through flanged nuts fixed to a workbench top or to a rear, fixed bench jaw. The vise screws pass through a movable front jaw and into tee-castings and handles that may be turned to rotate the screws. Sprockets are located on each screw between the tee castings and the front jaw and are coupled by a chain. One of the sprockets is fixed in position on its screw during a calibration procedure. The other sprocket remains free to rotate on its screw, except when a spring loaded pin in the corresponding tee-casting engages a depression in the face of the sprocket, thereby coupling that sprocket to the tee casting and associated screw.

6 Claims, 3 Drawing Sheets

TWIN SCREW VISE

BACKGROUND OF THE INVENTION

This invention relates to woodworking bench vises Woodworking benches are widely and typically used for supporting and, in many instances, temporarily fixing a workpiece in place on the bench while it is being worked. A variety of means for holding workpieces in temporarily fixed positions on or relative to woodworking benches have been utilized. Prominent among those means are vises in various configurations and locations on the bench, principally including front vises and end vises.

It is frequently desirable for either type of vise to be of substantial width, but it is difficult to obtain a satisfactory vise width greater than approximately twelve inches utilizing a single vise screw, even when multiple guide rods are employed. Accordingly, twin screws have been used in vises of substantially greater width and to realize other benefits associated with the use of twin screws. One such ability is the possibility of skewing the vise jaws relative to each other. While the ability to skew the vise jaws relative to each other (or to skew a movable jaw relative to the bench edge against which it closes) that is inherent in the use of two vise screws is often desirable, it is more frequently desirable that the two screws rotate in synchronism so that the front jaw will move in and out parallel to the rear one or, if a skewed position is needed, the relative skew will remain constant. Previous twin screw vises have achieved synchronized rotation by coupling the two screws with a chain, belt or similar means. Among other drawbacks, such twin screw vises have often been inconvenient to use and difficult to "recalibrate" after operating in a skewed configuration.

SUMMARY OF THE INVENTION

The twin screw vise of the present invention utilizes two threaded vise screw rods that are journaled through flanged nuts fixed to the workbench top or to a rear, fixed bench jaw. The vise screws pass through a movable front jaw, typically made of wood, and into tee-castings and handles that may be turned to rotate the screws. Sprockets are located on each screw between the tee castings and the front jaw and are coupled by a chain. One of the sprockets is fixed in position on its screw during a calibration procedure. The other sprocket remains free to rotate on its screw, except when a spring loaded pin in the corresponding tee-casting engages a depression in the face of the sprocket, thereby coupling that sprocket to the tee casting and associated screw.

Calibration of the vise is achieved by positioning the front jaw parallel to the rear one, typically by fully closing the vise while the normally fixed sprocket is permitted to rotate on its screw and the spring loaded pin engages the free wheeling sprocket. Set screws are then tightened in the fixed sprocket to lock it in position on its screw. Rotation of either handle will then cause both screws to rotate in synchronism so that the front jaw will move in and out parallel to the rear one. If skewing is desired, the spring loaded pin may be held in a retracted position while its associated handle is rotated and then released, which will permit the screw bearing the free wheeling sprocket to rotate independent of the sprocket (and therefore independent of the other screw) for up to one rotation, at which point the spring loading pin will re-engage the sprocket, thereby locking the two screws to rotate in synchronism, unless the pin is again retracted. The automatic re-engagement of the pin both serves to remind the vise user that the two screws have been decoupled and automatically recouples them before the vise skews so severely that damage to its mechanism is risked. The jaw can easily be returned to a parallel relationship simply by disengaging the spring loaded pin and rotating the associated handle in the opposite direction (and repeating the disengagement and rotation if necessary) until the pin reengages with the jaws parallel. Because of the positive location properties of the chain and sprocket and spring loaded pin mechanisms of the present invention, "recalibration" so that the jaws are exactly parallel can be easily and accurately accomplished without the need to fully close the vise.

It is thus an object of the present invention to provide a twin screw vise that may have a front jaw of substantial width and twin screws that can be positioned at different separations. It is a further objective to provide such a vise in which minimal racking occurs even when uneven pressure is applied to the jaws. It is another object of the present invention to provide a twin screw vise in which the moving front jaw can be skewed somewhat with respect to the rear (fixed) jaw to accommodate slightly tapered workpieces. It is a further objective of the present invention to provide a twin screw vise that can be calibrated easily, in which controlled skewing can be achieved conveniently and "recalibration" positioning the jaws parallel to each other can be quickly accomplished without the need to close the jaws fully.

These and other objectives, features and benefits of the present invention will become apparent by reference to the figures, the following description of the drawings and the claims.

DETAILED DESCRIPTION OF THE DRAWINGS

Figure 2:
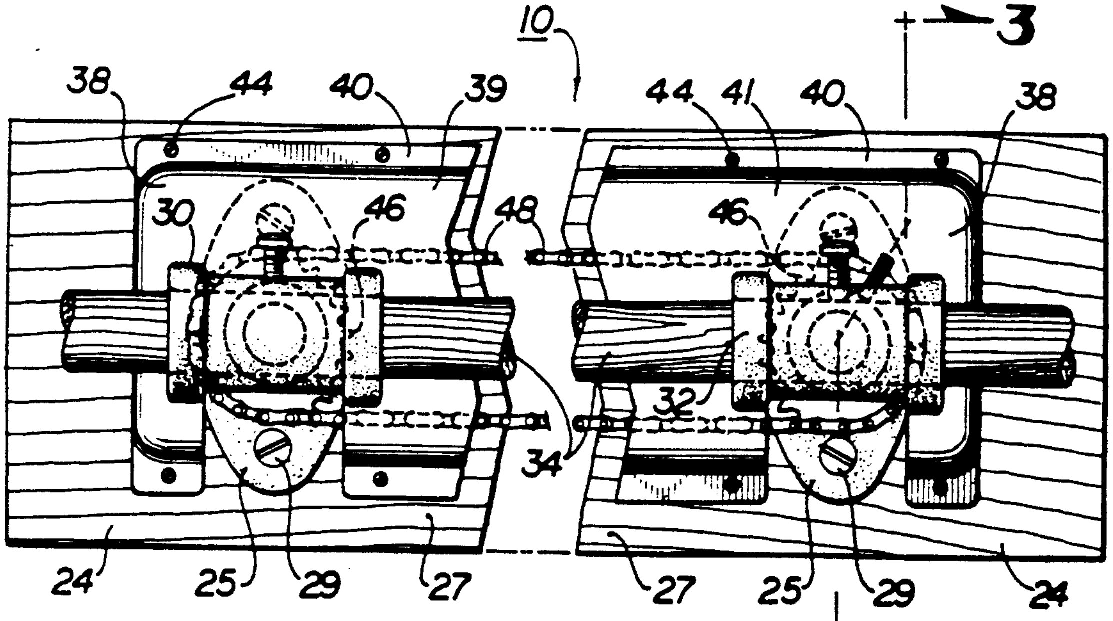
FIG. 2 is a front elevation view of the twin screw vise shown in FIG. 1, again showing central portions of the structure and the handles cut away for clarity.
Figure 3:
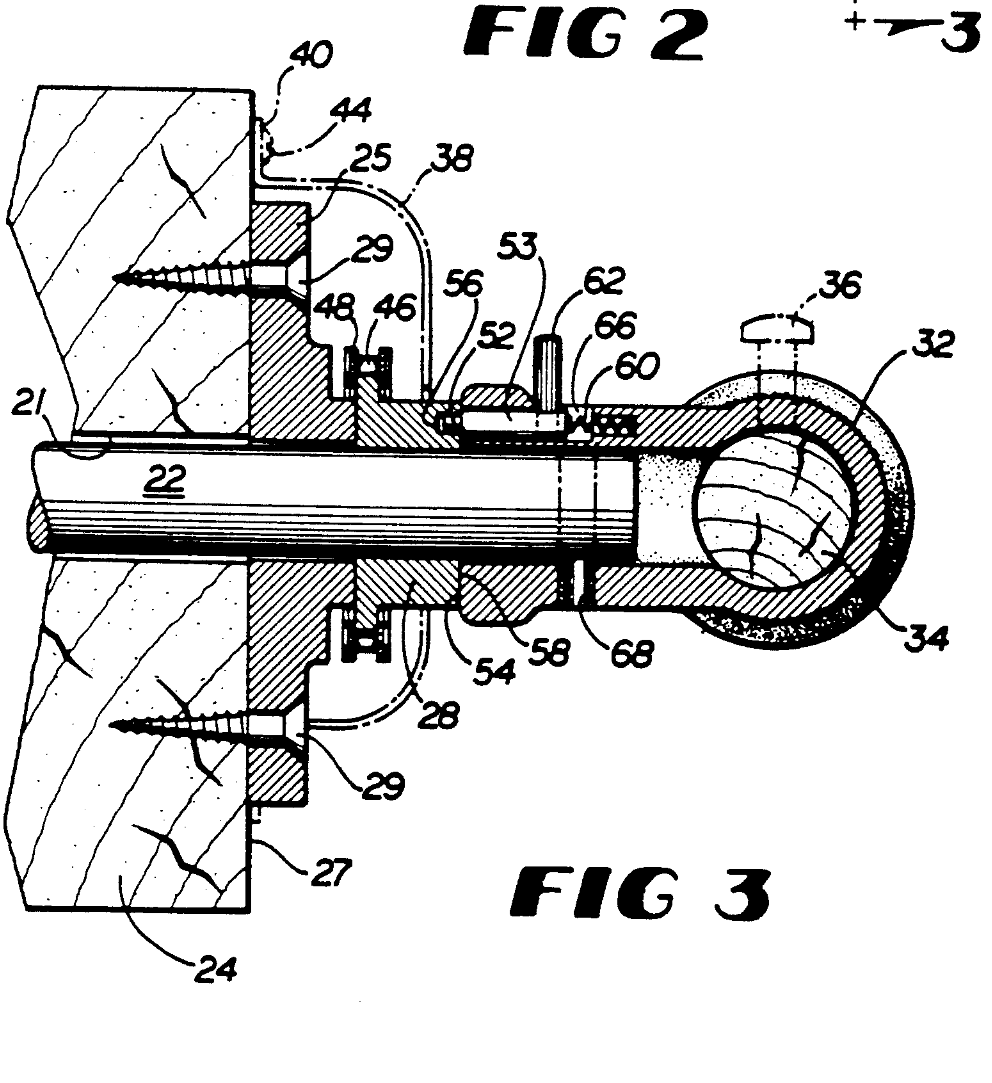
FIG. 3 is a section view through the disengageable screw of the twin screw vise shown in FIG. 1 taken along line 3—3 in FIG. 2.

The twin screw vise 10 of the present invention comprises generally two vise screws 12 and 14 that are appropriately threaded along most of their length and pass through flanged nuts 16 that are positioned in holes 18 in, and are affixed to, rear or fixed vise jaw 20. The front end portions 22 of vise screws 12 and 14 preferably are not threaded and pass through holes 21 in front or movable jaw 24, thrust plates 25, sprockets 26 and 28 and into tee fixture 30 or 32. As is best shown in FIGS. 2 and 3, thrust plates 25 are affixed to the front 27 of movable jaw 24 with screws 29 or other appropriate means. An appropriate handle 34 slides within each tee fixture 30 and 32 perpendicular to the longitudinal axes of screws 12 and 14. Each handle 34 may be fixed within its respective tee fixture 30 or 32 by tightening a threaded locking screw 36 that passes through the tee fixture 30 or 32 and may bear against the handle 34. Each tee fixture 30 and 32 is fixed on the end of its respective screw 12 or 14 with set screws, a rolled pin 68 or other appropriate means.

Figure 1:
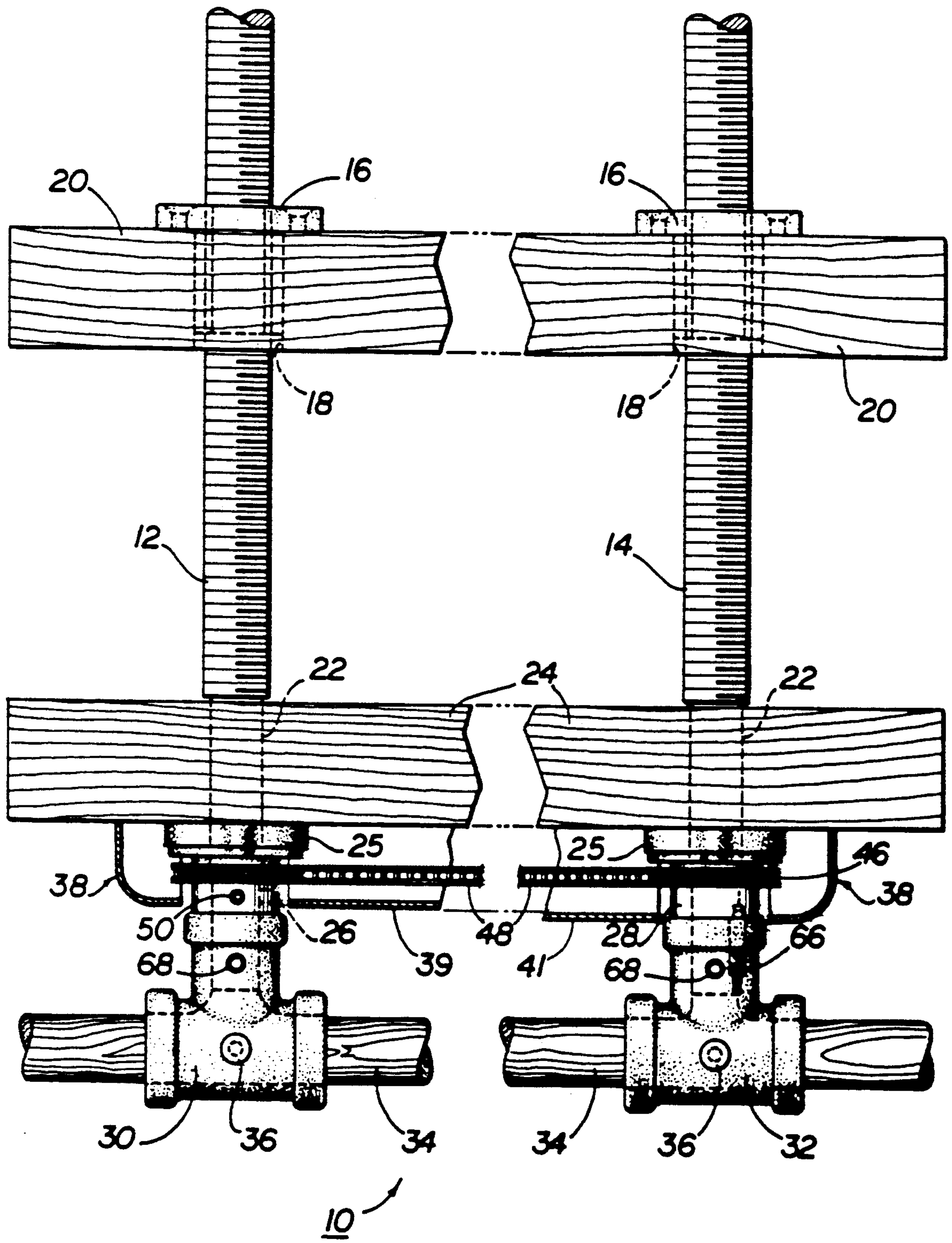
FIG. 1 is a top plan view of the twin screw vise of the present invention showing a central portion of the vise jaws, chain and cover cut away.

A plastic or metal dust cover 38 shown in section in FIGS. 1 and 3 and in elevation in FIG. 2, and having a flange 40, may be fixed to the front 27 of moveable jaw 24 with wood screws 44 or by other appropriate means. The dust cover 38 may be a single piece where the desired spacing between screws 12 and 14 is known. Alternatively, as illustrated in FIG. 1, one side 39 of cover 38 may be slightly larger than the other side 41 of cover 38 so that the two sides 39 and 41 can overlap in a nesting relationship and thus telescope to accommodate different spacings between screws 12 and 14.

Figure 4:
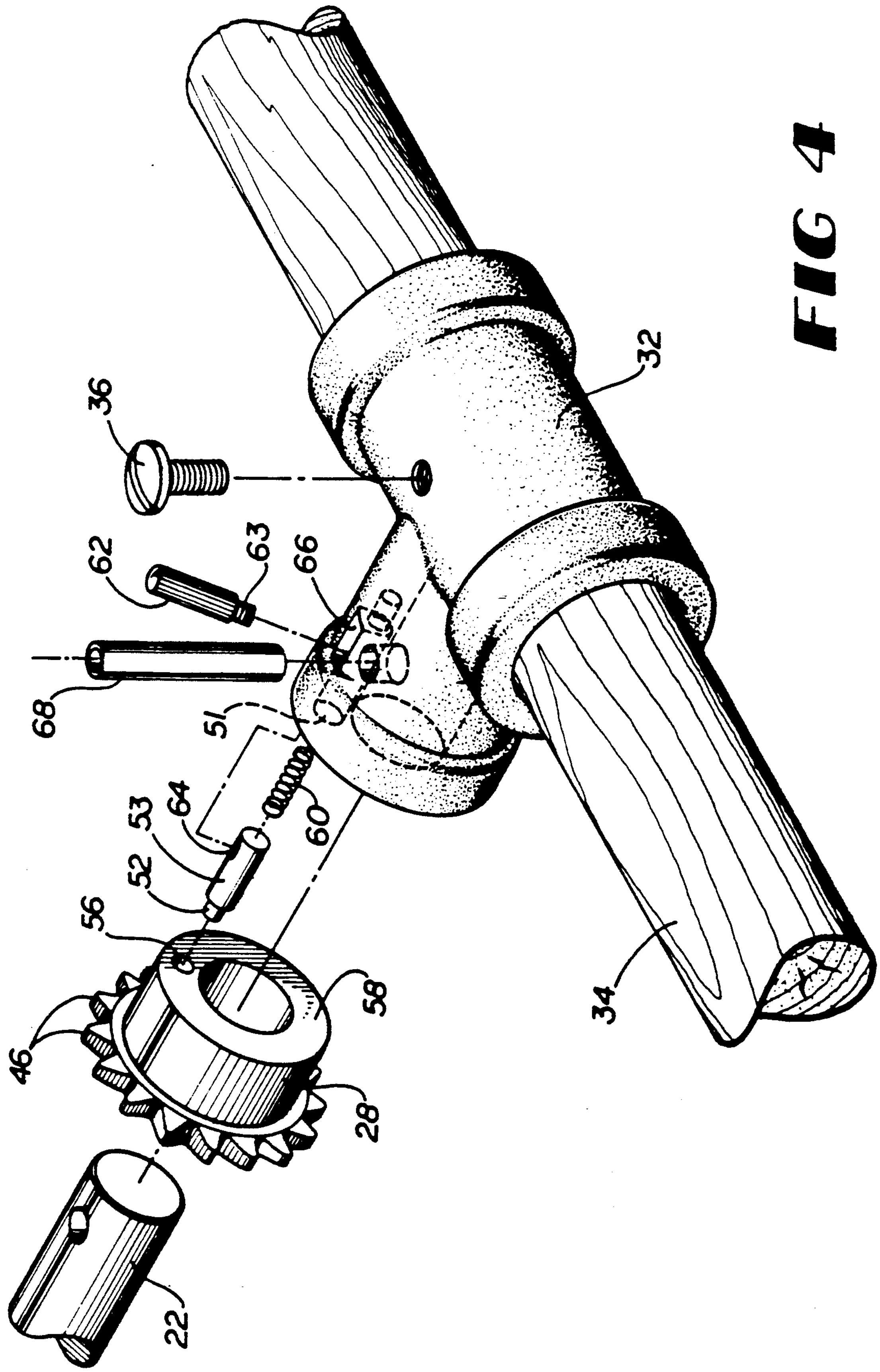
FIG. 4 is an exploded perspective view of the disengageable handle and sprocket mechanism that is shown in section in FIG. 3.

Each sprocket 26 and 28 has teeth 46 that engage a roller chain 48 that links the two sprockets so they always rotate in synchronism. Fixed sprocket 26 is locked on screw 12 with one or more set screws 50 that are threaded into sprocket 26 and may be tightened against vise screw 12. Rotatable sprocket 28 does not utilize set screws and may therefore freely rotate on vise screw 14 except when coupled to tee fixture 32 by a pin 52 (visible in FIGS. 1, 3 and 4) on the end of a plunger 53 that slides within a bore 51 in the sprocket bearing face 54 of tee fixture 32 so that pin 52 can protrude from face 54 of tee fixture 32 and be received within a depression 56 bored or otherwise formed in the face 58 of sprocket 28. Plunger 53 is urged toward sprocket 28 by a spring 60 but may be drawn into tee fixture 32 and against spring 60 in order to disengage pin 52 from depression 56 by applying pressure to a plunger lever 62. Lever 62 may be a short length of rod with a threaded end 63 received in a threaded bore 64 in and oriented perpendicular to the longitudinal axis of plunger 53. Lever 62 protrudes through a slot 66 that communicates with bore 51 in tee fixture 32.

As noted above, twin screw vise 10 may be "calibrated" by rotating the handles 34 to turn both vise screws 12 and 14 until moveable jaw 24 is fully closed against fixed jaw 20 while sprocket 26 is not locked on screw 12. After the jaws 20 and 24 are fully closed, and with pin 52 seated in depression 56, set screw 50 is utilized to lock fixed sprocket 26 in place on screw 12. Rotation of either handle 34 will then cause both screws 12 and 14 to rotate in synchronism and moveable jaw 24 to move in and out parallel to jaw 20, unless plunger lever 62 is manipulated to disengage pin 52 from the depression 56 in face 58 of sprocket 28

The foregoing description of this invention is for purposes of explanation and illustration. It will be apparent to those skilled in the art that modification and changes may be made to this invention as thus described without departing from its scope and spirit. For instance, the addition of additional depressions 56 in the face 58 of sprocket 28 will allow reengagement of sprocket 28 and tee fixture 32 after less than one full rotation of tee fixture 32 and screw 14 if it is desired that skewed coupling of the screws 12 and 14 be possible at smaller than one full rotation intervals. Among other substitutions, a vee or other type of belt, chain or coupling could be substituted for roller chain 48.

It will similarly be appreciated that skewing of movable jaw 27 causes screws 12 and 14 to move out of the parallel relationship they assume in the absence of such skewing, thereby limiting the skewing possible without damages to vise 10 and that the amount of skewing possible will be partially a function of (a) the distance jaws 20 and 24 are open, (b) the tolerance between flanged nuts 16 and screws 12 and 14, (c) the diameter of the holes 21 in jaw 24 (see FIG. 3) relative to the diameter of end portions 22 of screws 12 and 14. Accordingly, adjustment of these parameters, among others, will affect the operating characteristics of vise 10, including the amount of skewing possible.

We claim:

1. A twin screw vise, comprising:
(a) two vise screws positioned to move
(b) a vise jaw relative to
(c) a fixed member,
(d) a first sprocket journaled on and fixable to one of the vise screws,
(e) a second sprocket journaled to freely rotate on the other vise screw,
(f) a means for coupling the second sprocket to the other vise screw in at least one predetermined rotational position, comprising a spring-loaded, retractable pin positioned in and protruding from one of
(i) the second sprocket or
(ii) the tee fixture secured to the other vise screw so that the pin may be received within a depression in the other of
(i) the second sprocket or
(ii) the tee fixture secured to the other vise screw when the pin is not retracted,
(g) a chain coupling the two sprockets so they will rotate in synchronism, and
(h) two tee-fixtures, one of which is secured to each vise screw adjacent to the sprocket journaled on the respective vise screw.

2. The twin screw vise of claim 1, further comprising:
(h) two thrust plates, one of which is journaled on each of the vise screws,
(i) a dust cover affixed to the vise jaw and substantially surrounding the chain,
(j) two handles, one of which is positioned within each tee fixture in order to facilitate rotation of the tee fixture, and
(k) a means for fixing each handle to the tee fixture within which it is positioned.

3. The twin screw vise of claim 2, wherein the dust cover is adjustable in length to accommodate different spacings between the vise screws.

4. A mechanism for a twin screw vise utilizing a movable jaw and a fixed jaw, comprising:
(a) two vise screw assemblies, each comprising:
(i) a vise screw attached to
(ii) a tee fixture,
(iii) a sprocket journalable on the vise screw,
(iv) a thrust plate journalable on the vise screw for attachment to the movable jaw, and
(v) a flanged nut for receiving the vise screw and attachment to the fixed jaw,
(b) at least one set screw threaded into one of the sprockets for fixing that sprocket on one of the vise screws,
(c) a means for intermittently coupling the other sprocket to the other vise screw comprising a spring-loaded, retractable pin positioned in and protruding from one of
(i) the other sprocket or
(ii) the tee fixture fixed to the other vise screw to be received within a depression in the other of (i) the other sprocket or
(ii) the tee fixture fixed to the other vise screw when the pin is not retracted, and
(d) a chain for coupling the two sprockets.

5. The mechanism of claim 4, further comprising:
(e) a handle positionable in each of the tee fixtures,
(f) a means for fixing the handles in each of the tee fixtures, and
(g) a dust cover affixable to the movable jaw for substantially surrounding the chain when it is positioned to couple the sprockets.

6. The mechanism of claim 5, wherein the dust cover is adjustable in length to accommodate different spacings between the vise screw assemblies when the mechanism is assembled for use.

* * * * *